Patented Jan. 16, 1945

2,367,483

UNITED STATES PATENT OFFICE 2,367,483

STABILIZATION OF VINYL CHLORIDE-VINYLIDENE CHLORIDE COPOLYMERS

La Verne E. Cheyney, Akron, Ohio, assignor to Wingfoot Corporation, Akron, Ohio, a corporation of Delaware No Drawing. Application November 25, 1942, Serial No. 466,915

2 Claims. (Cl. 260—86)

This invention relates to the stabilization of a copolymer of vinyl chloride and vinylidene chloride. The two components of the copolymer may be present in an amount varying from 75 to 95 per cent of vinyl chloride and 25 to 5 per cent of vinylidene chloride. A minor portion of another monomer may be included. Therefore, the copolymer is composed substantially entirely of vinyl chloride and vinylidene chloride in the ratio of about 3:1 to the ratio of about 19:1. The stabilizer employed is dicyandiamide. It renders the copolymer more stable in the presence of heat and is suitable for use in films and other products made from the copolymer.

The dicyandiamide is insoluble in the solvents usually employed for such a copolymer and is advantageously incorporated in the copolymer by being dispersed in the copolymer while the copolymer is in solid form. A ball mill or other suitable mixer may be used for this purpose. The amount of stabilizer employed will depend upon the stability desired. As little as 0.1 per cent of dicyandiamide renders the copolymer somewhat stable. Up to 5 per cent or more may be used. In general, about 1 per cent will be employed for the usual commercial operations.

The following example is illustrative: Eighty-five parts of vinyl chloride are copolymerized with fifteen parts of vinylidene chloride to produce a plastic. This material is soluble in solvents such as cyclohexanone, methyl ethyl ketone, ethylene dichloride, monochlorobenzene, etc. By virtue of this solubility, it is more satisfactory than polyvinyl chloride for the production of self-supporting films, coatings, etc. It is a thermoplastic material and may, therefore, be employed for the fabrication of molded goods, calendered sheet material, etc. The methods for accomplishing such purposes are the usual ones well known in the art.

Continuing the example: One per cent of dicyandiamide is milled into the copolymer in a ball mill. The resulting mixture is dispersed or dissolved in ethylene dichloride to produce a 12 per cent solution. This is then cast on a smooth surface, and on evaporation of the solvent a stabilized self-supporting film is obtained.

Plasticizers and other suitable ingredients, such as fillers, etc., may be mixed with the plastic either in film form or for other uses, as for coating fabrics, etc.

What I claim is:

1. A copolymer composed substantially entirely of vinyl chloride and vinylidene chloride in the ratio of about 3:1 to the ratio of about 19:1, which copolymer is stabilized with dicyandiamide.

2. A self-supporting film composed essentially of a copolymer composed substantially entirely of vinyl chloride and vinylidene chloride in the ratio of about 3:1 to the ratio of about 19:1, which copolymer is stabilized with dicyandiamide.

LA VERNE E. CHEYNEY.